United States Patent

[11] 3,590,287

[72] Inventors Don A. Berlincourt
Chagrin Falls;
Todd R. Sliker, Shaker Heights, both of, Ohio

[21] Appl. No. 768,584
[22] Filed Sept. 5, 1968
[45] Patented June 29, 1971
[73] Assignee Clevite Corporation
Continuation of application Ser. No. 595,073, Nov. 17, 1966, now abandoned.

[54] PIECOELECTRIC THIN MULTILAYER COMPOSITE RESONATORS
9 Claims, 15 Drawing Figs.

[52] U.S. Cl. .......... 310/8.2, 310/8.1, 310/8.6, 310/9.5, 310/9.8, 333/30, 333/72
[51] Int. Cl. .......... H01v 7/00
[50] Field of Search .......... 310/8.1, 8.3, 8.5, 8.7, 9.1, 9.8, 8.6; 333/30, 72

[56] References Cited

UNITED STATES PATENTS

| | | | |
|---|---|---|---|
| 3,433,982 | 3/1969 | Kaname et al. | 310/9.8 X |
| 3,474,268 | 10/1969 | Rudnick | 310/8.5 |
| 3,487,239 | 12/1969 | Schafft | 310/8.5 |
| 3,489,931 | 1/1970 | Teaford | 310/8.5 X |
| 3,012,211 | 12/1961 | Mason | 333/30 |
| 3,276,622 | 9/1966 | Malagodi | 310/8.1 |
| 3,363,139 | 1/1968 | Schiauone | 310/8.1 |
| 3,365,590 | 1/1968 | Lobdell | 310/8.3 |
| 3,377,588 | 4/1968 | Pigquendar | 317/235 |
| 3,378,704 | 4/1968 | Miller | 310/9 |
| 3,388,002 | 6/1968 | Foster | 117/217 |
| 3,398,021 | 8/1968 | Lehrer | 117/200 |
| 3,399,314 | 8/1968 | Phillips | 310/8.6 |
| 3,401,275 | 9/1968 | Curran | 310/8.5 |
| 3,422,371 | 1/1969 | Poirier | 310/8.2 |

OTHER REFERENCES

IEEE TRANSACTION ON SONICS AND ULTRASONICS, Aug. 1966, Vol. SU13 No. 3 p. 99, article entitled "Multilayer Thin Film Piezoelectric Transducers" by John de Kleck

*Primary Examiner*—Milton O. Hirshfield
*Assistant Examiner*—Mark O. Budd
*Attorney*—Frederic B. Schramm

ABSTRACT: Alternate thin layers of piezoelectric material having differently orientated piezoelectric axes with respect to each other are placed on a substrater and electroded to form a high frequency resonator. The thickness mode resonant frequency of the composite structure corresponds a proper fraction of the resonator operating frequency, layer thickness varying between 0.2 and 100 microns corresponding to approximately 10 percent of the substrate thickness.

INVENTORS
DON A. BERLINCOURT
TODD R. SLIKER

BY Frederic B. Schramm

ATTORNEY

INVENTORS
DON A. BERLINCOURT
TODD R. SLIKER
BY
Frederic B. Schramm
ATTORNEY

INVENTORS
DON A. BERLINCOURT
TODD R. SLIKER

BY [signature]

ATTORNEY

PIEZOELECTRIC THIN MULTILAYER COMPOSITE RESONATORS

This application is in part a continuation of our copending application Ser. No. 595,073, and now abandoned, filed Nov. 17, 1966.

This invention relates to resonant devices and more particularly to such devices employing a plurality of layers of piezoelectric material.

The typical prior art resonator comprises a wafer of piezoelectric material such as quartz or ceramic material provided with electrodes on opposite surfaces thereof. Upon application of an alternating signal, the material between the electrodes is driven electrically in a predetermined vibrational movement, for example, thickness sheer, thickness extensional, and so forth, depending on the orientation or polarization of the wafer material.

The resonant frequency of the resonator is dependent on the overall wafer and electrode thickness and increases with decrease in thickness. At high frequencies very thin wafers are required if fundamental modes are to be used.

Because of difficulties in fabricating extremely thin piezoelectric wafers, prior art high frequency resonators are typically intermediate frequency resonators operated at an odd harmonic of the fundamental frequency. Even harmonics cannot be used since perfect stress cancellation occurs and the electromechanical coupling is zero. At odd harmonics some coupling exists due to imperfect stress cancellation. Even though the odd harmonic coupling is substantially reduced by partial cancellation, in many instances it is of sufficient magnitude to render the resonator suitable for filter applications. For instance, an AT-cut quartz wafer at its fundamental has a coupling factor of about 0.09. At the third, fifth, seventh, and ninth harmonics, couplings of 0.03, 0.018, 0.013 and 0.010, respectively are obtained.

In order to achieve greater utility in high frequency applications it has been proposed to deposit a thin film of a suitable material upon a substrate such as a quartz wafer, the thickness of such a film being much less than has heretofore been practical as the thickness of a quartz wafer.

It is an object of the invention to provide improved devices of the type employing layers of piezoelectric material and to form such devices as filters and transformers.

Other objects of the invention are to obtain increased efficiency of conversion in piezoelectric devices, to enable such devices to operate at very high frequencies, to obtain a high frequency selectivity and to provide multiterminal units such as three and four terminal units serving as transformers.

Still another object of the invention is to form composite resonators as multiterminal devices.

In a preferred embodiment of the invention a plurality of layers of material are formed upon a substrate. A sufficient number of surfaces of the layers are electroded so that input terminals may be applied to a pair of electrodes to form a piezoelectric driving element. In order to form a three terminal or four terminal device which may act as a transformer, one or more additional layers are also electroded at their surfaces. The device may operate at a harmonic of the fundamental frequency of the composite structure but operates generally at a frequency close to that corresponding to a half-wave of the thickness of each layer.

Other objects and advantages will become apparent from the following description taken in conjunction with the accompanying drawings, wherein.

Like reference characters are utilized throughout the drawings to designate like parts.

Figure 1:
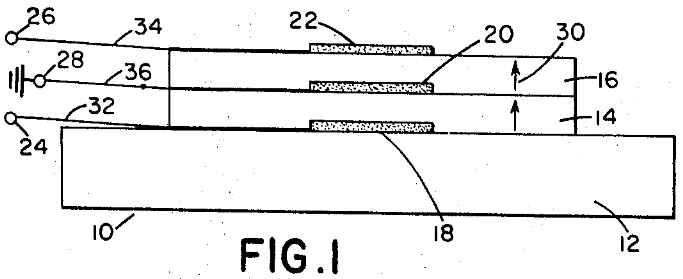
FIG. 1 is a diagram of a three-terminal device employing two thin deposited layers of piezoelectric material upon a substrate with $c$ axes, as in wurtzite crystals, or axes as in sphalerite crystals, perpendicular to the surfaces of the layers and in alignment.

Referring to FIG. 1 of the drawing showing a three-terminal piezoelectric device in accordance with the invention identified generally by the reference numeral 10, the device 10 in general comprises a substrate 12 with two superposed layers 14 and 16 of piezoelectric material deposited thereon. An electrode 18 is interposed between the substrate 12 and the layer or film of piezoelectric material 14. Likewise, an electrode 20 is interposed between the layers 14 and 16, and an electrode 22 is applied to the upper surface of the piezoelectric layer 16. The wafer substrate 12 may be either circular or rectangular in shape. Likewise, the layers 14 and 16 and the electrodes 18, 20, and 22 may be either circular or rectangular in shape. For convenience in production, however, they are preferably circular.

In order that electrical connections may be made to the surfaces of the piezoelectric layers 14 and 16 the electrodes 18 and 22 are connected to terminals 24 and 26, respectively, one being an output terminal and the other being an input terminal. By way of illustration the terminal 24 is shown as an output terminal and the terminal 26 as an input terminal. However, the invention is not limited to this arrangement, as the device is symmetrical, and either terminal may be the output terminal and either terminal the input terminal. In the arrangement illustrated the electrode 20 is common to the adjacent surfaces of the layers 14 and 16 and common to the input and output circuits having a connection to a third terminal 28 shown as ground.

In the arrangement in FIG. 1 the layers 14 and 16 are composed of piezoelectric material which is polarized perpendicular to its surface, both layers being polarized in the same direction. The piezoelectric axes 30 are perpendicular to the surface of the substrate 12 and extend in the same direction therefrom. The piezoelectric axes referred to in the case of wurtzite type hexagonal crystals are the *c* axes. The axes are referred to as *c* axes in such material as cadmium sulfide and cadmium selenide, zinc oxide, beryllium oxide, aluminum nitride wurtzite zinc sulfide and solid solutions thereof. In sphalerite cubic crystals such as zinc sulfide and gallium arsenide, e.g., the piezoelectric axes are the [111] axes. In ferroelectric crystals the ferroelectric axis may usually be identified as the piezoelectric axis. With ferroelectric lithium niobate and lithium tantalate, this terminology is not appropriate, however, and one might rather identify either the ferroelectric axis (Z) or the Y-axis as a piezoelectric axis.

Figure 2:
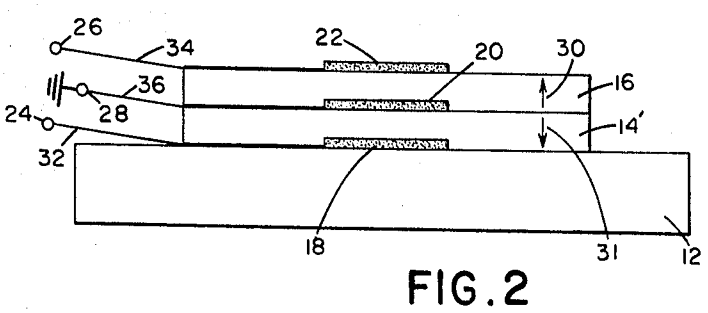
FIG. 2 is a diagram corresponding to FIG. 1 of a similar device in which the piezoelectric layers are oppositely polarized, that is have their $c$ axes or [111] axes extending in opposite directions.

However, the invention is not limited to having the piezoelectric axes extend in the same direction. As shown in FIG. 2, for example, one of the layers 14 may be replaced by a layer 14′ with its piezoelectric axis 31 in a direction opposite to the piezoelectric axis 30 of the layer 16.

For clarity in the drawing the electrodes 18, 20, and 22 have been shown relatively thick in comparison with the layers 14 or 14′ and 16, which have also been shown relatively thick compared to the substrate 12. In practice, however, the electrodes are generally much thinner than the piezoelectric layers, and the layers are a fraction of substrate thickness. When the layers are deposited upon the substrate 12, the deposite is formed with uniform thickness and the portion of the layer above an electrode merely rises slightly higher than the portion surrounding the electrodes. In order to minimize loss of acoustic energy and to help preserve the energy-trapping effect of the portions of the layers 14 and 16 beyond the electrodes 18, 20, and 22, leads 32, 34, and 36 from the electrodes to the terminals 24, 26, and 28 are taken off in different radial directions from the center of the structure. Preferably the leads 32, 34, and 36 are integral with the electrodes 18, 22, and 20 respectively. The actual construction of the electrodes, leads and of the layers 14 and 16, is not a part of the present invention and they may take the form illustrated in the copending application of Daniel R. Curran and Don A. Berlincourt, Ser. No. 542,627, filed Apr. 14, 1966, now Pat. No. 3,401,275 assigned to the same assignee as the present application.

The substrate 12, which may be in the form of a wafer, is preferably formed from a material having a high mechanical Q, and as explained in more detail in the copending application of Curran and Berlincourt may have a frequency temperature coefficient of magnitude and polarity such as to cancel the frequency temperature coefficient of the piezoelectric layers 14 and 16. Suitable materials for the substrate 12 are quart and metallic compositions such as Invar and Elinvar. Other materials which may be employed as substrate are lithium gallate, lithium niobate and lithium tantalate, for instance.

The electrodes 18, 20, and 22 are most conveniently formed by vapor deposition of electrically conductive materials such as gold on chromium or aluminum by one of the numerous techniques known in the prior art. When the electrodes are formed by vapor deposition a mask is placed on the surface of the substrate or previous layer to cover all of the surface except the portion where the electrode is to be formed and the radially extending portion where the lead is to be formed.

When the terminal 26 is employed as the input terminal, the piezoelectric layer 16 serves as the driving element and the piezoelectric layer 14 serves as the driven element together with the substrate 12. Each layer 14 and 16 may be formed by vapor deposition or sputtering of suitable materials which can be oriented during vapor deposition.

As illustrated there are at least two axially distributed films of oriented piezoelectric material on a thin substrate (that is having lateral dimensions large with respect to axial dimensions), with at least one of the films driven electrically at a frequency at or near mechanical resonance of the composite structure, and with the other film or films developing the electrical output.

The substrate provides a mounting upon which to form the piezoelectric layers. It is not driven electrically, serving only as a base for the unit. However, the substrate acts also to raise the overall mechanical Q above that of the piezoelectric material and acts also to exert major control over the frequency-temperature coefficient. The device achieves frequency selection and may achieve either voltage step-up or stepdown (impedance transformation).

The preferred method of forming the piezoelectric layers 14 and 16 is by vapor deposition of a layer of piezoelectric material on the surface of the wafer 12. As disclosed in copending application Ser. No. 363,369 filed on Apr. 29, 1964, by Lebo R. Shiozawa and assigned to the same assignee as the present invention, material selected from the group consisting of cadmium sulfide, cadmium selenide, zinc oxide, beryllium oxide, wurtzite zinc sulfide and solid solutions thereof as well as aluminum nitride, lithium niobate, and lithium tantalate can be vapor deposited on the surface of a substrate with an orientation such as to produce a thickness extensional mode of vibration.

In the embodiment of FIG. 1, a thickness extensional mode of vibration is employed. Preferably the layers 14 and 16 are deposited on a substrate of quartz. In producing the embodiment of FIG. 2, suitable means are employed for reversing the polarization of the layer 14.

Figure 3:
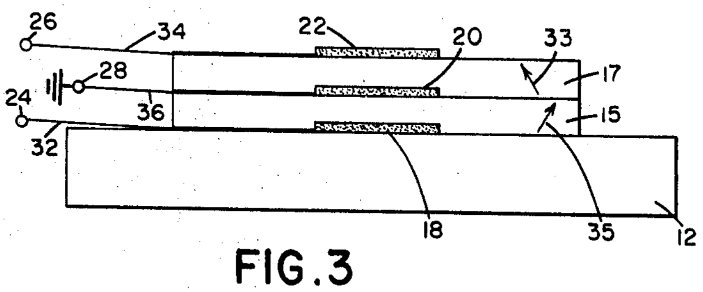
FIG. 3 is a diagram like that of FIGS. 1 and 2 but for piezoelectric layers with $c$ or [111] axes oblique.

Although the devices of FIGS. 1 and 2 have been described as employing elements having thickness extensional mode of vibration, the invention is not limited thereto; and piezoelectric elements 15 and 17 as shown in FIG. 3 may be employed which have a thickness shear response either with the *c* axes or [111] axes extending in parallel directions or, as shown in the drawing, tilting in different directions with respect to a line perpendicular to the layer surfaces in adjacent piezoelectric layers. Although structures of the type described could be excited to resonate in a mode of vibration other than the one of the thickness modes of vibration, such as thickness extensional or thickness shear we prefer to use one of the thickness modes. It is in a thickness mode of vibration that advantage is taken of the possibility of depositing very thin layers to obtain the high resonant frequency corresponding to such thin layers.

In the publications "Ultra High Frequency CdS Transducer," IEEE Transactions on Sonics and Ultrasonics, Vol. SU–11, No. 2, pp. 63—68 (1964) by N. F. Foster and "Cadmium Sulfide Evaporated Layer Transducers," Proc. IEEE, Vol. 53, No. 10, pp. 1400—1405 (1965) by N.F. Foster a process for vapor depositing cadmium sulfide is disclosed. The latter publication discusses obtaining an orientation to produce a thickness shear mode of vibration. Such prior art techniques are suitable for the formation of layers 15 and 17 shown in FIG. 3.

A preferred combination for the embodiment shown in FIG. 3 comprises a driving and driven elements 17 and 15, respectively, formed by the vapor deposition of cadmium sulfide on a substrate 12 of "AT-cut" quartz. The cadmium sulfide elements are preferably vapor deposited by a process similar to that disclosed in the N. F. Foster publication with an orientation such as to produce a thickness shear mode of vibration. To achieve optimum temperature stability, "AT-cut" substrate 12 is slightly off-cut so that the quartz material has a slight positive temperature frequency characteristic which counteracts the larger negative temperature frequency characteristic of the cadmium sulfide material. "AT-cut" quartz is much preferred because of its temperature stability and very favorable mechanical characteristics.

Because of its high Q and low frequency temperature coefficient, AT-cut quartz is the preferred substrate material and the description will be directed thereto. The before-mentioned Foster publication disclosed that cadmium sulfide vapor deposited with an angle between the molecular beam and the plane of the substrate has a shear response. We have additionally found that the shear response is optimum when the actual angle between the cadmium sulfide film's $c$ axis and the perpendicular to the film surface is between 20° and 40° and maximum at about 30°. This is explained more fully in the aforesaid copending application of Curran and Berlincourt.

The devices illustrated in FIGS. 2 and 3 serve as 1 1 ratio filter transformers. They are particularly useful as band pass filters. However, the invention is not limited thereto. They may be connected as step-up auto transformers by connecting the input voltage to the common terminal 28 and either of the other two terminals 24 and 26, and taking the output from terminals 24 and 26.

Figure 4:
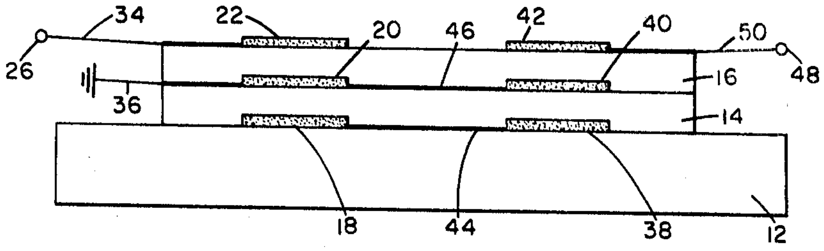
FIG. 4 is a diagram of the type of apparatus illustrated in FIGS. 1, 2, and 3 in which devices are cascaded with a plurality of three-terminal units formed in layers deposited upon the same substrate.

Such three-terminal devices may also be connected in tandem in compact form to increase the selectivity by mounting several of them upon a single substrate acoustically isolated from each other. FIG. 4 illustrates such an arrangement for two units, although a greater number may be connected in tandem in the same manner as illustrated in FIG. 4, layers of suitable piezoelectric materials such as cadmium sulfide 14 and 16 are deposited upon a substrate 12 with two or more sets of electrodes at the successive surfaces of the substrate 12 and the layers 14 and 16. For example, there may be electrodes 18, 20, and 22, with an input terminal 26 connected to the electrode 22, and with the electrode 20 grounded. In addition there is a set of electrodes 38, 40, and 42, corresponding to electrode 18, 20, and 22 deposited upon a different portion of the surface of the substrate 12 and the layers 14 and 16. However, in this case electrode 18 is not connected to an output terminal, but instead to the electrode 38 by means of a lead 44 formed integral with the electrodes 18 and 38. The electrode 40 is also grounded through a lead 46 connected to electrode 20. The electrode 42 is connected to an output terminal 48 through a lead 50.

The relationship between thicknesses is preferably such that the structure forms a composite mass loaded multitransformer structure comprising a wafer substrate, a plurality of piezoelectric layers thereon, and electrodes associated with said piezoelectric layers, the effective composite thickness of piezoelectric layers, said electrodes and said substrate defining an electroded region having a resonant frequency, $f_a$, and the surrounding region of said multitransformer structure defining a resonant frequency, $f_b$, higher in magnitude than $f_a$, and the effective composite thickness of the electroded region being such relative to that of surrounding region that ratio $f_a$ to $f_b$ is in the range 0.8 to 0.99999. The frequency ratio $f_a/f_b$ is obtained by controlling the thickness of the electrodes or alternatively by selective deposition of a dielectric such as silicon monoxide or silicon dioxide. Dielectric tuning may in addition be used to lower the resonant frequency $f_a$ to its desired value by adjusting the composite element to have an integral number of half wave lengths at the desired frequency.

By suitable connections the devices employing the principles of this invention may also be formed as four-terminal devices instead of three terminal devices with complete direct current electrical isolation between primary and secondary circuits. Moreover, by multiplying layers of piezoelectric material a frequency selective transformer may be formed having a greater ratio of transformation than in the devices previously discussed. For example, as shown in FIG. 5, there is a substrate 12 upon which successive layers 54, 56, 58, 60, 62, 64, 66, and 68 are deposited.

Figure 5:
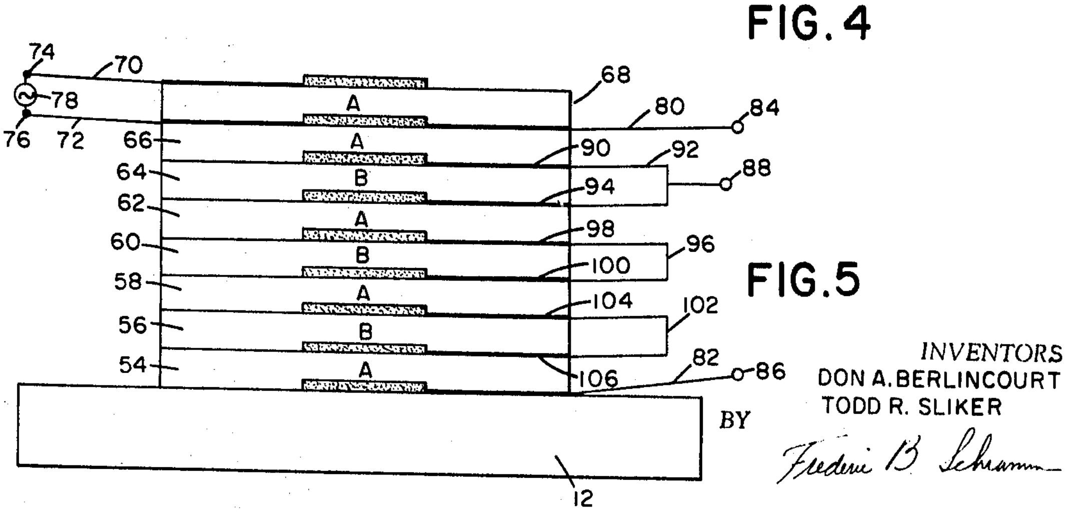
FIG. 5 is a diagram of the three-terminal device in which voltage transformation of a ratio greater than 1 to 1 is achieved by the deposition of a plurality of successive layers one upon another employing the same substrate and with electrodes at adjacent surfaces in order to achieve electrical connection between successive active layers.

In the arrangement of FIG. 5 films are employed which differ in some respects so that the first and second different types of layers are employed, designated in FIG. 5 as type A layers and type B layers, with different piezoelectric response. The type A layers are piezoelectric and the type B layers are either inactive with respect to piezoelectric properties or also piezoelectric but may differ in some other respect in their piezoelectric properties or response from the type A layers. In the specific arrangement illustrated in FIG. 5 the type A layer 68 constitutes the driving element having electrodes with leads 70 and 72 connected to terminals 74 and 76 of a high frequency input source 78. The invention is not limited to a single-layer driving element and does not include arrangements with more than one layer in the driving element or in both driving and driven elements.

The layers 54, 58, 62 and 66 are also type A layers. In order to accomplish a step-up ratio of voltage transformation the layers 54, 58, 62, and 66 are electrically connected in series through leads 80 and 82 to output terminals 84 and 86 respectively. As shown the output terminal 84 is connected to the same electrode as the input terminal 76. However, if complete direct-current electrical isolation between the primary and secondary circuits is desired, the layer 66 may be eliminated and an output connection to an output terminal 88 may be made from the upper surface of the piezoelectric layer 62, the output terminal 88 then being employed in place of the output terminal 84.

Although the terminals 74 and 76 have been referred to as input terminals, and the terminals 84 and 86 as output terminals, it will be understood that the invention is not limited to a step-up transformation ratio and if desired instead the apparatus may be employed as stepdown frequency selective transformer with the input connected to the terminals 84 and 86 or 88 and 86 and the output taken from the terminals 74 and 76.

In the arrangement of FIG. 5 the difference between the B-type layers and the A-type layers is assumed to be that the B-type layers are inactive with respect to piezoelectric properties, or their piezoelectric properties are not utilized. Then in order to connect the A-type layers of secondary circuit in series, metallic films are provided between the A- and B-type layers and the metallic films on either side of each B-type layer are connected so as to provide a direct series connection from one A-type layer to the next. Thus the metallic film or electrode 90 between A and B layers 66 and 64 is connected by a strip 92 to a metallic film or electrode 94 between the B and A layers 64 and 62. Similarly, there is a connection 96 between electrodes 98 and 100 and a strip 102 between electrodes 104 and 106. In the arrangement of FIG. 5, the B-type layers serve to interpose sections of reversed stress so that all A-type layers will be stressed in the same phase and their voltage outputs will be cumulative. If the B layers are metallic, they serve as the connections 92, 96, and 102. To avoid energy loss, improve $Q_m$, and avoid decrease in selectivity, the B layers are preferably not piezoelectric if the connections 92, 96, and 102 are employed.

If it is desired to avoid the use of the shortcircuiting strips 92, 96, and 102, this may be accomplished by making both A and B layers with piezoelectric properties but suitably polarized so that the voltages of successive layers do not cancel out. Thus, if care is taken to make the thickness of each layer A or B one-half wave length for the frequency of the input source 78 so that the state of stress of the A-type layers is opposite to the state of stress of the B-type layers at any instant, then all the A-type layers may be arranged with their $c$ axes pointing upward as in layer 16 of FIG. 2 and all the B-type layers may be arranged with their $c$ axes pointing downward as in the case of layer 14′ of FIG. 2. If this is done the electrodes 90, 94, 98, 100, 104, and 106 may be eliminated. It will be understood of course that electrodes are still required for connection to the terminals 74 and 76 and to terminals 84 and 86 and to the terminal 88 if it is employed.

Figures 6, 7, 8, 9:
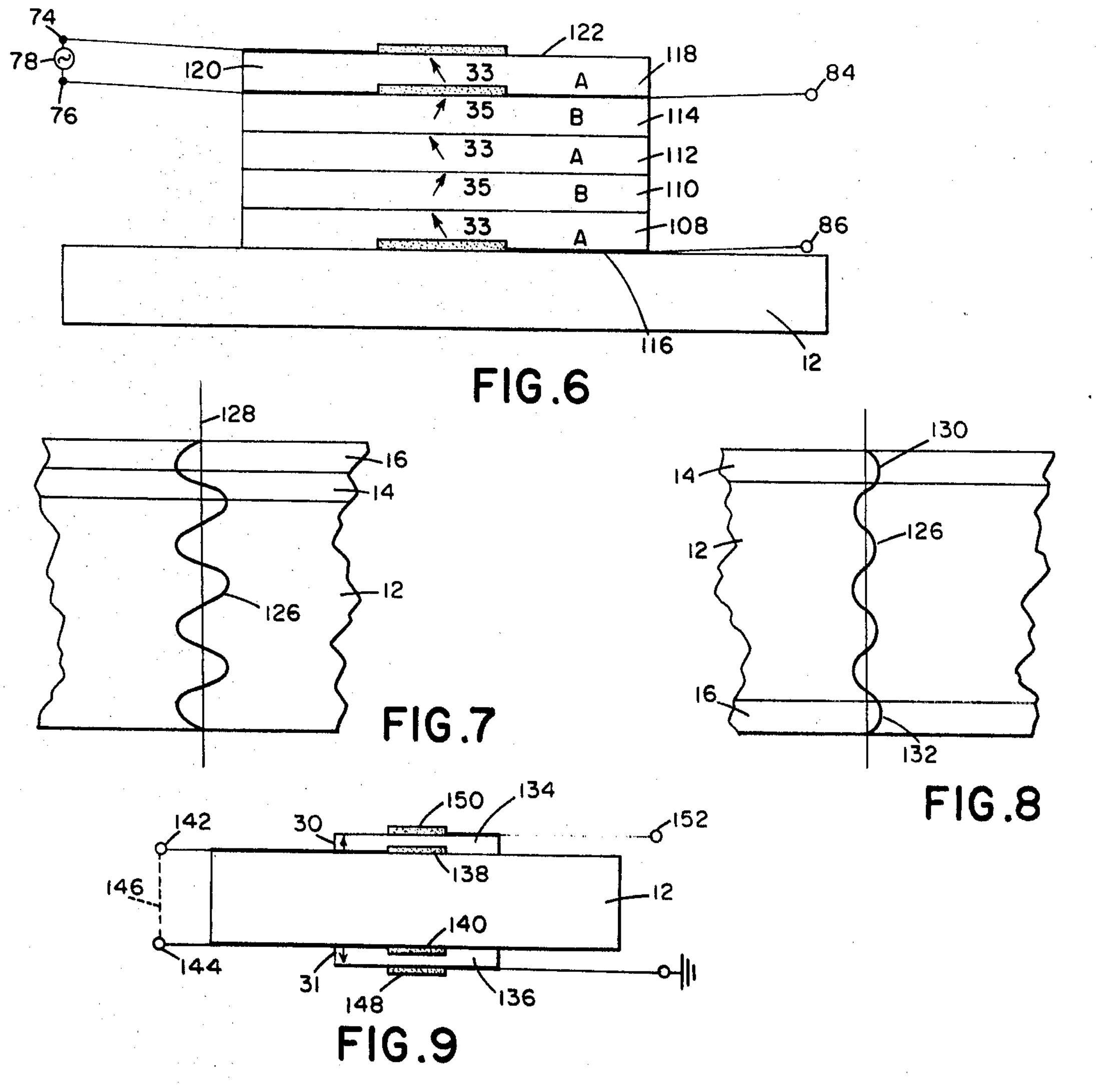
FIG. 6 is a diagram corresponding to FIG. 5 but employing material so polarized as to have a shear mode of vibration, with alternate layers having $c$ axes tilted at opposite angles so that successive layers may be in direct contact and electroding is unnecessary except where terminals are to be brought out for input and output connections.
FIG. 7 is a fragmentary diagram of devices similar to those illustrated in FIGS. 1 through 6 showing the effect of operation at a frequency which corresponds to an integral number of half-waves in a composite structure but such that the deposited layers each have a thickness differing from one-half wave length.
FIG. 8 is a diagram of a modified structure in which layers are deposited upon opposite surfaces of a substrate and inequality in stress distribution is balanced.
FIG. 9 is a diagram of a four-terminal device employing piezoelectric layers deposited on opposite surfaces of a substrate.

An arrangement without intervening electrodes or inactive layers or metallic deposits is illustrated in FIG. 6. This is accomplished by using A- and B-type layers which have piezoelectric axes such that responses of adjacent layers to thickness shear waves are opposite and the voltages developed across successive layers are additive when one standing acoustic wave length is twice the thickness of one layer.

In FIG. 6 there are four piezoelectric layers 108, 110, 112, and 114 in direct contact with each other with an electrode 116 at the lower end of the stack and an electrode 118 above, connected to the output terminals 86 and 84, respectively. There is likewise a layer 120 resting upon the electrode 118 with an upper electrode 122. The electrical connection to the source 78, having terminals 74 and 76, is made from the electrodes 122 and 118. In the arrangement of FIG. 6 the layers 108, 112, and 120 are A-type layers and the layers 110 and 114 are B-type layers.

FIG. 6 illustrates also the employment of a shear mode of vibration with the *c* axes 33 of the A-type layers tilted upward to the left and the *c* axes 35 of the B-type layers pointing upward to the right. FIGS. 5 and 6 both illustrate transformers with a 4 to 1 ratio of transformation. However, as shown by the drawing, the employment of piezoelectric layers which have the *c* axes differently directed in successive layers enables the employment of a simpler and more compact structure by the elimination of layers such as the B-type layers in FIG. 5 which do not contribute piezoelectrically to the functioning of the apparatus.

It will be understood that the invention is not limited to three- or four-terminal devices and frequency selective transformers of any particular size or power handling capacity. However, by way of illustration the layers of piezoelectric material may consist of evaporated films of cadmium sulfide of the order of 1 micron to 10 microns in thickness. The substrate 12 may be made of quartz on the order to 100 microns thickness. The metallic layers of electrodes may be on the order of 1,000 to 3,000 Angstroms thick.

The resonant frequency is related to the thickness of the composite structure, the velocity of propagation, density, stiffness and other properties of the materials of which the layers and substrate composed, and the mode of vibration. However, the order of magnitude of the resonant frequency for a given thickness is substantially the same for the various materials which may be used or which have been mentioned by way of example. The resonant frequency for the same body in thickness shear mode of vibration is different from that in thickness of extensional mode of vibration, but still of the same order of magnitude, the ratio being approximately 2.

In the case of Cadmium Sulfide layers a layer thickness from about 0.2 to 0.6 microns corresponds to a half-wave length for a resonant frequency of 5 GHz., with greater thickness corresponding to proportionately lower resonant frequencies. Thus for 30 MHz. (20 million cycles per second) resonant frequency a corresponding layer thickness is from 33 to 100 microns.

There is a certain range of frequencies within which our resonator may most advantageously be used. One of the factors determining the upper frequency at which the resonator may most advantageously be used is the range of thicknesses available in the substrate. Roughly the effective coupling factor of the device decreases with the square root of the ratio of acoustic half-wave lengths in the substrate to film thickness.

Other factors which have a bearing on the highest frequencies at which the device is advantageously used are the Q of the substrate, the possibility of using the substrate with a negative temperature coefficient to compensate positive temperature coefficient of the layer, and dimensional tolerances. One of the advantages of using quartz as a substrate is its high Q, but this value falls off at higher frequencies. For example at 500 MHz. the quartz substrate in a piezoelectric resonator has a higher Q than a cavity resonator whereas at 5,000 MHz. (5 GHz.) the Q is lower than in the resonant cavity, which becomes relatively smaller in physical dimensions at higher frequencies, so that dimensional tolerances of a cavity resonator are less of a problem at 5 to 10 GHz. than at 500 MHz.

Another advantage of using quartz substrates is that quartz may be so cut as to provide a negative temperature coefficient, whereas other practical substrate materials which might be considered to provide a low Q at a higher frequencies do not exhibit a negative temperature coefficient of frequency.

Dimensional tolerance control to obtain the desired resonant frequency also becomes more difficult in applying the thinner layers required for high frequencies especially above 10GHz.

There is also a lower value for the frequencies at which our device is most advantageously used. It is difficult to apply a high quality piezoelectric layer at good adherence to a substrate above a thickness of about 100 microns, which corresponds approximately to a resonant frequency of the order of 30 MHz. Although other good resonant structures are available at the lower frequencies none of these are transformers.

Our device operates most advantageously, therefore, in the range of film thicknesses of the order of 0.2 to 100 microns, which for most materials result in a frequency range from 30 to 50 MHz. to 3 to 10 GHz.

As shown in FIGS. 1 and 2, the layers 14 and 16 are shown smaller in diameter than the substrate 12 although this is not necessary. The electrodes 18, 20, and 22 in turn are smaller in diameter than the piezoelectric layers 14 and 16. This is preferable, although the maximum radial dimensions may be the same if portions are cut back from the circumference where leads are taken off.

In the embodiments of FIGS. 1 and 2, for example, the substrate may be 1 centimeter in diameter and 100 microns thick. The metal layers or electrodes may be from 2 to 10 millimeters in diameter and the cadmium sulfide layers may be 5 millimeters to 1 centimeter in diameter. Thus, in the embodiment illustrated the electrode diameter is of the order of 40 percent of the diameter of the cadmium sulfide layers, and the diameter of the cadmium sulfide layers is of the order of 50 percent to 100 percent of the substrate diameter. The electrode thickness is of the order of 1 percent to 30 percent of the piezoelectric layer thickness, which is of the order of 1 percent to 10 percent of the substrate thickness.

The arrangements illustrated are capable of operation at ultrahigh frequencies, useful, e.g., in UHF television circuits. They have substantially higher Q than can be realized with conventional coupled coil air core transformers and can be made much smaller. They provide improved frequency selectivity, acting both as transformers and filters. They permit direct-current isolation of the input from the output. The devices can be made very small and they are compatible with other thin film technology and can be used with integrated circuits. As filters they introduce less insertion loss, have better temperature stability and greater resistance to shock and vibration than inductance-capacity-type filters heretofore available in the high frequency range.

The thin film transformers and filters described have a number of advantages over what has been done before. As transformers, these devices have the following advantages over air core transformers:

1. more miniature
2. more frequency selective
3. able to operate at higher frequencies.

As filters, these devices have the following advantages over LC (inductor-capacitor) filter networks:

1. more miniature
2. more frequency selective
3. less insertion loss
4. better temperature stability
5. higher resistance to shock and vibration.

As filters, these devices have the following advantages over cavity type filters:

1. more miniature
2. more frequency selective.

As filters these devices have the following advantages over filters sold under the trademark "Uniwafers" consisting of a collection of acoustically isolated resonators on a single wafer of quartz:

1. able to operate at higher frequencies
2. do not require external transformers and capacitors.

As filters these devices have the following advantages over crystal quartz resonators connected in a filter network:

1. more miniature
2. able to operate at higher frequencies 3. do not require inductors to obtain a broad band pass.

In general, the devices are compatible with thin film evaporation techniques (these techniques are used in the fabrication of integrated circuits). As filters the devices may find a large volume use in UHF television circuits since the UHF band is from 470 to 890 MHz.

When preparing frequency selective devices with multiple films having alternate layers with *c* axes differently oriented, it will be understood that in the evaporation process suitable techniques are employed for reversing or changing the *c* axes after each layer of desired thickness has been built-up. For example, when producing units of the type illustrated in FIG. 6 when the cadmium sulfide vapor is deposited with an angle between the molecular beam and the plane of the substrate to obtain a shear response, the substrate is either tilted back and forth from one position to the other after each layer of desired thickness has been deposited to reverse the tilt of the *c* axis or the substrate is rotated 180° around an axis perpendicular to its surface, or some other means is used to produce reversed tilt of the *c* axis. For example, there may be means to move the source from one side to the other side.

In the aforesaid copending patent application of Curran and Berlincourt a composite resonator is illustrated in which it is not necessary for the driving element consisting typically of a cadmium sulfide film to be precisely one-half wave length in thickness. The input frequency is such that there is an integral number of half-wave lengths in the composite structure. However, in the embodiments of our invention which employ a plurality of layers of material on the same side of a substrate as in FIGS. 1 to 6 we prefer to maintain the relationship between the input frequency and the thickness of the piezoelectric layers such that the layers are very closely one-half wave length in thickness in order to avoid partial cancellation of energy and in order to maintain the maximum possible effective coupling. Nonetheless, our invention is not limited to such arrangements and our devices may be arranged to overcome the partial cancellation of output.

FIGS. 7 and 8 illustrate that as a result of the stress distribution in the composite structure the films should be distributed on each side of the substrate if the piezoelectric layer is not exactly one-half wave length thick at the principal resonant frequency of the composite structure. FIGS. 7 and 8 illustrate in fragmentary from structures in which the thickness of the composite structure is such as to provide seven half-wave lengths of variation in stress. The curve 126 represents the stress distribution with respect to an arbitrarily chosen axis 128 in a case where the thickness of the cadmium sulfide piezoelectric layer is less than one-half wave length at the design frequency of the composite structure.

It will be observed that in layer 14, complete cancellation of the stress takes place. With more than two piezoelectric layers cancellation effects resulting from deviation from one-half wave length would be severe even with layer thicknesses deviating little from precisely one-half wave length. Cancellation effects may be minimized by applying layers to both sides of the substrate. Although not limited thereto, best results are obtained by dividing the layers, one-half on each side of the substrate. In the diagram of FIG. 8 there are two layers on substrate 12 with the layers 14 and 16 on opposite parallel surfaces of the substrate 12. The arrangement shown is symmetrical and cancellation effects do not take place even though there is the same deviation in thickness of the layers 14 and 16 from one-half wave length as shown in FIG. 7.

Figure 10:
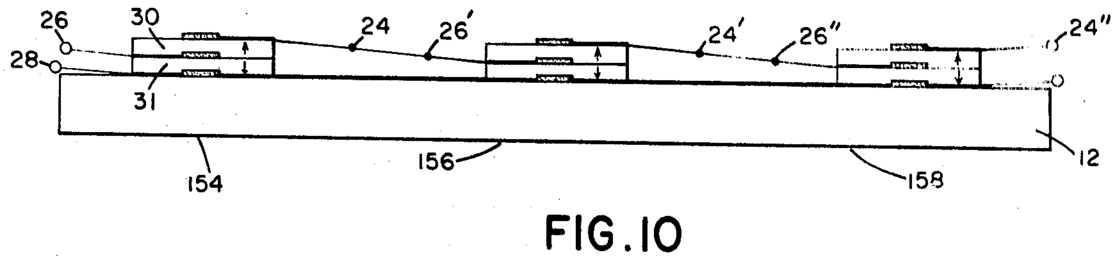
FIG. 10 is a circuit diagram of an arrangement for further cascading of three-terminal devices to achieve a higher ratio of transformation.

A schematic and circuit diagram of a four-terminal device employing the balancing principle of FIG. 8 is shown in FIG. 9 but in this case piezoelectric layers 134 and 136 with *c* axes 30 and 31 in opposite directions are deposited upon the substrate 12. Electrodes 138 and 140 on the upper and lower surfaces of the substrate 12 are connected to terminals 142 and 144 respectively. On the lower surface of the piezoelectric layer 136 is an electrode 148 shown as grounded in this embodiment. Correspondingly, on the upper surface of the piezoelectric layer 134 is an electrode 150 connected to terminal 152. The arrangement of FIG. 9 forms a four-terminal device, with terminals 142 and 152 constituting the other pair. A three-terminal device is formed if terminals 142 and 144 are connected together by a conductor 146 and terminal 148 is connected to ground. In this manner a step-up voltage ratio of 1 to 2 may be achieved, if desired, utilizing the terminal 144 as an input terminal, and terminal 152 as an output terminal.

Where higher ratios of transformation are desired, additional layers of piezoelectric material may be deposited on each of the surfaces of the substrate 12 such as the multiple-layer arrangement of FIG. 5. However, where higher ratios of transformation are needed, we prefer in employ a cascading arrangement of successive 2 to 1 transformers as illustrated in FIG. 10 if it is desired to retain the maximum possible value of the Q. In the arrangement of FIG. 10, three units 154, 156, and 158, each corresponding to a 2 to 1 ratio unit such as generally illustrated in FIG. 2 or FIG. 3 are cascaded so as to obtain a ratio of 8 to 1. Impedance matching is necessary.

The terminals are rearranged so that each unit 154, 156, and 158 constitutes a 2 to 1 step-up transformer. The input terminals 26 and 28 are connected across one of the layers 31, and the output terminal 24 applies the doubled voltage from layers 30 and 31 of unit 154 in series to an input terminal 26′ of unit 156. Four times the input voltage appears at the output terminal 24′ of unit 156. This voltage is applied to the input terminal 26″ of unit 158 so that 8 times the original voltage appears at the output terminal 24″ of unit 158. It will be understood that FIG. 10 is merely diagrammatic and that the units may or may not be mounted upon a common substrate with a physical arrangement upon the substrate such as illustrated in FIG. 4 of this application of somewhat like that of FIG. 8 of the copending application of Curran and Berlincourt.

Figure 11:
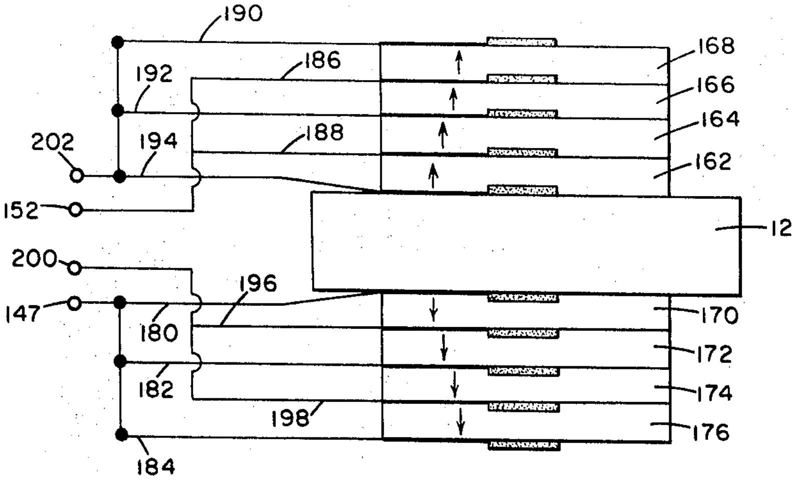
FIG. 11 is a diagram of an arrangement for avoiding the need for reversing polarity in multilayer piezoelectric structures.

In the arrangement of FIG. 11 the need for reversing the polarization of successive layers of piezoelectric material in a multilayer structure is obviated by connecting alternate layers in parallel.

The substrate 12 carries on its upper surface successive layers 162, 164, 166, and 168, all with their piezoelectric axes in the same direction, namely away from the substrate 12. The substrate 12 likewise carries on its lower surface layers of piezoelectric material 170, 172, 174, and 176 also having all of their piezoelectric axes in the same direction, namely away from the substrate 12. Electrodes are applied to each surface of each piezoelectric layer. The input terminal 152 is connected to the top surfaces of the piezoelectric layers 162 and 166 through leads 188 and 186. Return terminal 202 is connected to the top surfaces of layers 168 and 164 and the bottom surface of layer 162 through leads 190, 192, and 194. Thus, the electric field in layers 162 and 166 are 180° out of phase with respect to the electric fields in layers 164 and 168. As a result, at the principal resonance of the composite structure the acoustic waves generated in layers 162, 164, and 166, and 168 add constructively.

The output terminal 200 is connected to the bottom surfaces of the piezoelectric layers 170 and 174 through leads 196 and 198. Return terminal 147 is connected to the top surface of layers 170 and the bottom surfaces of layers 172 and 176 through leads 180, 182, and 184. As a result, at the principal resonance of the composite structure the voltages generated across layers 170, 172, 174, and 176 are constructively combined to produce a maximum signal at output terminal 200.

Resonators have been described in which the composite structure of substrate and layers vibrates at a multiple of the fundamental frequency of the composite structure, and the thickness of a deposited layer is a half-wave length for the harmonic at which vibration takes place, or is relatively close to a half-wave length. However, the invention is not limited thereto. That operation may effectively take place at lower harmonics of the fundamental frequency of the composite structure may be better understood by considerations of cases represented by FIGS. 12 and 13.

Figure 12:
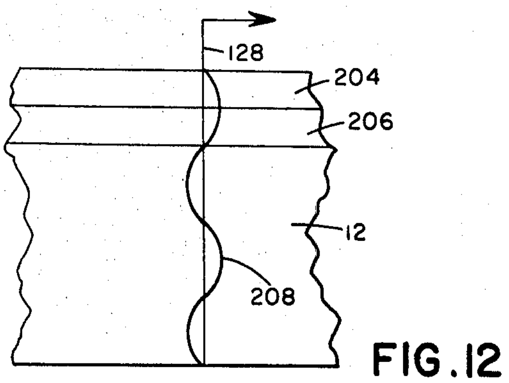
FIG. 12 is a diagram, with electrodes and connections omitted, of stress distribution on a composite structure driven at the fourth harmonic of the fundamental frequency of the composite structure.
Figure 13:
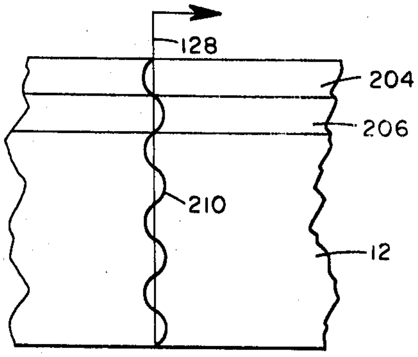
FIG. 13 is a diagram corresponding to FIG. 12 but showing the stress distribution with the composite structure driven at the eighth harmonic of the fundamental frequency of the composite structure, with each deposited layer having a thickness corresponding to one-half wave length at the eighth harmonic.

These are cross-sectional views with electrodes and connections now shown to avoid unnecessary complication. Both elements are identical, the only difference being that the element of FIG. 12 is driven at $f_4$ (the fourth harmonic of the fundamental frequency of the composite structure) and the element of FIG. 13 is driven at $f_8$ which is $2 f_4$. The space variation of stress is shown schematically in both cases. Each layer in FIG. 12 is λ/4, each layer in FIG. 13 is λ/2; yet the effective electromechanical coupling is the same in each case. It is true that in general a higher frequency is preferred as advantage is taken of the capability of high frequency operation afforded by the use of deposited films to obtain thin layers.

If the film thickness becomes greater than λ/2 cancellation effects occur and the coupling factor $k$ decreases. For film thicknesses less than λ/2 $k$ depends on the ratio of active to inactive thicknesses with allowance for the sinusoidal variation of stress. Thus in the illustrations represented by FIGS. 12 and 13 with the driving layer λ/2 at the eighth harmonic, the device will work well at harmonics: 8, 7, 6, 5, and 4. These harmonics would represent layers having thickness which are integral fractions of wave lengths, respectively one-half, seven-sixteenths, three-eights, five-sixteenths, and one-quarter. Coupling will be the same at the eighth and fourth harmonics and slightly higher between. A fairly good quantitive comparison of the coupling factors at the various harmonics is the (average stress)/(peak stress) ratio in the driven area for the condition of a constant ratio of driven to undriven thickness. For the construction represented by FIGS. 12 and 13 this is as follows:

| Harmonic number: | Average stress / peak stress |
|---|---|
| 10 | .43 |
| 9 | .54 |
| 8 | .636 |
| 7 | .70 |
| 6 | .725 |
| 5 | .71 |
| 4 | .636 |
| 3 | .525 |
| 2 | .44 |
| 1 | .20 |

In FIGS. 12 and 13 the input layer is the outer film 204 and the output layer is the layer 206 adjacent the substrate 12. The stress distribution curve 208 in FIG. 12 represents the fourth harmonic of the fundamental frequency for the composite structure and the stress distribution curve 210 in FIG. 13 represents the eighth harmonic of the fundamental.

Figure 14:
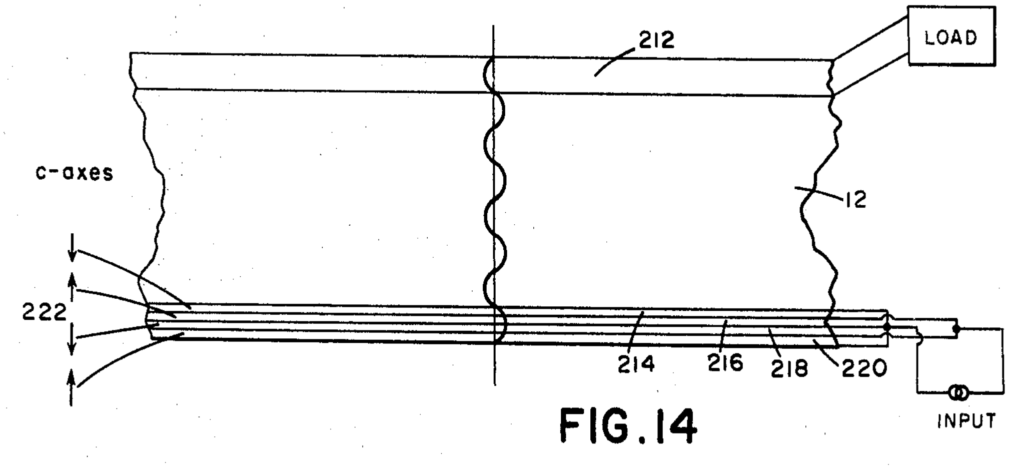
FIG. 14 is a diagram of a composite structure with input and output layers having different thicknesses.

An advantageous arrangement for stepped up voltage as well as filter action is illustrated in FIG. 14. An output layer 212 is mounted upon one surface of the substrate 12 and the four input layers 214, 216, 218, and 220 are mounted upon the opposite surfaces of the substrate 12. The total thickness of the input layers corresponds to the thickness of the output layer, for example, the thickness of the output layer may be λ/2 at the eighth harmonic of the fundamental frequency of the composite structure whereas the four input layers, 214, 216, 218, and 220 add up to λ/2 at the eighth harmonic.

Figure 15:
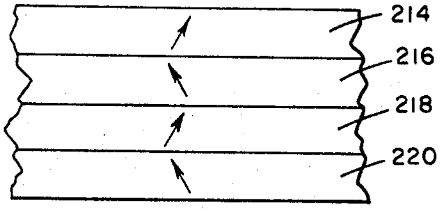
FIG. 15 is a fragmentary diagram of input layers in the arrangement of FIG. 14.

In this case the input section consisting of the layers 214, 216, 218, and 200 is composed of four layers connected in parallel and with polar axis in alternate directions as indicated by the alternating $c$ axes 222. Such a parallel arrangement is especially convenient when employing shear mode layers with alternate layers having their $c$ axis tilting in different directions as in FIG. 15.

The connection of FIG. 14 as shown or modified to employ film with shear mode of vibration, leads to a step-up of ratio 4. Reversed input and output connections change the step-up to one-quarter. One of the advantages of this arrangement is that the four-layer section degrades the Q of the substrate (and the overall coupling if the multilayer section is the output section) far less than if the layer were the same thickness as the layer on the opposite surface.

If the upper film 212 is λ/2 in thickness, each lower film layer is λ/8 thickness. On the other hand if the upper layer 212 is λ/4 in thickness, the lower layers 214, 216, 218, and 220 are each λ/16.

Referring to the foregoing table of Average Stress/Peak Stress for various overtones, when the arrangement of FIG. 14 is operated at the ninth or tenth harmonic, layer 214 in the four layer group toward the inside would contain reversed stress and might therefore be left unconnected. As shown the best results are obtained by operating at one of the overtones of the group consisting of the harmonics 4, 5, 6, 7, and 8. For higher harmonics it is preferable to make the film thicknesses a smaller portion of the overall thickness.

Under optimum conditions the last outside film of the multilayer section, namely the film 220 may be a high Q metal film in order to raise the coupling factor slightly, since this is where the stress is lowest. Since the average stress in each layer varies with position, under ideal conditions the layers need not be made equal in thickness, with the more highly stressed layers away from the outside made thinner so that the voltages generated in each layer are substantially equal and can be connected in parallel with minimum loss.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

It is claimed and desired to secure by Letters Patent of the United States:

1. A high frequency piezoelectric resonator device for operation at a frequency in the range represented by a wavelength of the order of from 0.2 to 100 microns, said device comprising in combination a wafer substrate, a plurality of alternate superposed layers of piezoelectric material of first and second different types with respect to piezoelectric axes and capable of acoustic vibrations, and a plurality of electrodes, there being at least two of said layers of the first type having parallel faces and having piezoelectric properties, each electrode being applied to a different one of said faces, the superposed layers being mounted on said substrate with parallel faces in force transmitting relation to each other with means for energizing one of the piezoelectric layers, the layers and substrate together forming a composite structure having an overall thickness defining a resonant frequency in a thickness mode of vibration corresponding to $1/n$ times the frequency at which the resonator is to be operated, where $n$ is any integer, and the thickness of each layer is substantially in the range of from 0.2 to 100 microns and is of the order of 1 percent to 10 percent of substrate thickness.

2. A high frequency piezoelectric resonator device for operation at a frequency in the range represented by a wavelength of the order of 0.2 to 100 microns, said device comprising in combination a wafer substrate, a plurality of superposed layers of piezoelectric material mounted thereon with parallel surfaces in force transmitting relation to each other with means for energizing one of the layers, together forming a composite structure having an overall thickness defining a resonant frequency in a thickness mode of vibration corresponding to $1/n$ times the frequency at which the resonator is to be operated, where $n$ is any integer, and the layer thickness is substantially in the range from 0.2 to 100 microns and is of the order of 1 percent to 10 percent of substrate thickness, the piezoelectric axes of successive layers being tilted from a normal to the surface.

3. A device as in claim 2 wherein the piezoelectric axes of successive layers are tilted in different directions from the normal.

4. A high frequency piezoelectric resonator device comprising in combination a wafer substrate, a plurality of superposed layers of piezoelectric material mounted thereon with parallel faces in force transmitting relation to each other with means for energizing one of the layers, together forming a composite structure having an overall thickness defining a resonant frequency in a thickness mode of vibration corresponding to 1/$n$ times the frequency at which the resonator is to be operated, wherein $n$ is any integer and the layer thickness is substantially in the range from 0.2 to 100 microns and is of the order of 1 percent to 10 percent of substrate thickness there being alternate layers of piezoelectric material capable of acoustic vibrations, said alternate layers being of different types with respect to their piezoelectric axes, said layers of the first type having parallel faces and having piezoelectric properties with piezoelectric axes extending in a predetermined direction, the layers of the second type having its piezoelectric axes oriented in a different direction the axes of both types being titled with respect to a normal from the parallel faces, and said layers of the first type having a plurality of electrodes, each electrode being applied to a different one of said faces, each of at least three of such electrodes being adapted for connection to an exterior terminal.

5. A device as in claim 4 wherein the layers of the first and second types differ with respect to piezoelectric response.

6. A device as in claim 4 wherein the layers of the second type have opposite faces which are electrically connected.

7. A device as in claim 4 wherein the layers of the second type are inactive piezoelectrically.

8. A device as in claim 4 wherein the layers of the first and second types are piezoelectric with piezoelectric responses differently oriented.

9. A device as in claim 4 wherein the layers have a thickness shear mode of vibration with piezoelectric axes of layers of the first type tilting at one angle with respect to a normal to the layer face and piezoelectric axes of layers of the second type tilting at a different angle with respect to a normal to the faces of the layers.